UNITED STATES PATENT OFFICE.

GEORGES EMILE GRENARD, OF PARIS, FRANCE.

PRESERVING COMPOUND.

No. 805,285.      Specification of Letters Patent.      Patented Nov. 21, 1905.

Application filed September 8, 1904. Serial No. 223,738.

*To all whom it may concern:*

Be it known that I, GEORGES EMILE GRENARD, a citizen of the French Republic, residing at Paris, in the Department of the Seine, France, have invented new and useful Improvements in Preserving Compounds for the Conservation of Eggs and other Alimentary Substances, of which the following is a specification.

This invention relates to a compound for the preservation of eggs and other alimentary substances either liquid or solid.

The compound of the present invention is obtained by the mixing together and the chemical reaction of a properly-diluted acid, especially diluted hydrochloric acid, on a mixture of silicate of soda, phosphate of soda, sugar, and water, mixed together in suitable proportions, the following proportions of ingredients having proved to give satisfactory results:

| | | |
|---|---|---|
| Silicate of soda (commercial) | 20,000 grams | |
| Phosphate of soda | 200 grams | |
| Sugar | 200 grams | For 100 kilog. 400 |
| Water | 60,000 grams | |
| Hydrochloric acid diluted at 13 per cent | 20,000 grams | |
| Total | 100,400 grams | |

The reaction of the diluted hydrochloric acid on the mixture of the other substances above mentioned produces a gelatinous body which is more or less opaline. It may, if desired, be colored in any desirable manner. The application of this product to the exterior of the article to be preserved prevents the evaporation of the aqueous constituents of the substances that are so covered and also prevents the admission of air thereto, since it forms a perfect air-tight envelop.

This improved preservative may be compounded as follows: A mixture of silicate and phosphate of soda, sugar, and water is prepared separately in substantially the aforesaid proportions, the necessary quantity of diluted hydrochloric acid being subsequently added when the compound is required for use. The product is then poured or otherwise covered over the substances which are intended to be preserved and in such a manner that these substances are completely enveloped by it. After a few minutes the whole mass forms into a lump, assuming the appearance of a more or less firm gelatinous body which remains quite unalterable by atmospheric influences.

All products are similarly treated, whether eggs, fruit, vegetables, butter, cheese, poultry, or any other alimentary substance. A simple washing in water is all that is necessary to removing the conserving coating, which leaves the alimentary product quite free from adulteration. In some instances the articles to be preserved may be suitably incased to hold them in a desired form and the compound applied to such casing.

Having described my invention, I claim—

1. A preserving compound composed of dilute acid, silicate of soda, phosphate of soda, sugar and water, mixed together in suitable proportions.

2. A preserving compound for alimentary substances, composed of dilute hydrochloric acid, silicate of soda, phosphate of soda, sugar and water, mixed together in suitable proportions.

3. A preserving compound composed of the following ingredients in substantially the following proportions: two hundred parts dilute hydrochloric acid at thirteen per cent.; two hundred parts silicate of soda; two parts phosphate of soda; two parts sugar, and six hundred parts water.

In testimony whereof I have signed my name to this specification in the presence of two subscribing witnesses.

GEORGES EMILE GRENARD.

Witnesses:
    HANSON C. COXE,
    HENRY DANTE.